United States Patent [19]

Lawrence et al.

[11] Patent Number: 5,720,990
[45] Date of Patent: Feb. 24, 1998

[54] FOOD SHEETER

[75] Inventors: Eric Clay Lawrence; James Merril, both of South El Monte, Calif.

[73] Assignee: Lawrence Equipment, Inc., South El Monte, Calif.

[21] Appl. No.: 541,815

[22] Filed: Oct. 10, 1995

[51] Int. Cl.⁶ .................................................. A21C 3/02
[52] U.S. Cl. .................. 425/229; 264/169; 425/230; 425/363; 425/436 R; 426/389; 426/502
[58] Field of Search .................. 425/229, 230, 425/363, 436 R; 264/169, 349; 426/389, 502, 503

[56] References Cited

U.S. PATENT DOCUMENTS

| | | | |
|---|---|---|---|
| 2,055,205 | 9/1936 | Pereyra | 425/363 |
| 4,285,090 | 8/1981 | Jurkowski | 425/230 |
| 4,405,298 | 9/1983 | Blain | 426/389 |
| 4,966,541 | 10/1990 | Mistretta | 425/229 |
| 5,180,593 | 1/1993 | Mistretta et al. | 425/229 |
| 5,402,264 | 3/1995 | Wilbur et al. | 359/508 |
| 5,576,033 | 11/1996 | Herrera | 4258/363 |
| 5,580,583 | 12/1996 | Caridis et al. | 425/192 |

*Primary Examiner*—Jay H. Woo
*Assistant Examiner*—Iurie A. Schwartz
*Attorney, Agent, or Firm*—Lyon & Lyon LLP

[57] ABSTRACT

A wire separator apparatus for a food sheeter includes motor driven feed spools of separator wire, the separator wire being suspended from wire pulleys across the face of a roller. Motor driven take-up spools collect separator wire dispensed from the feed spools as the separator wire is automatically moved across the face of a roller. A fresh section of separator wire is continuously drawn across the roller, substantially eliminating wire breakage.

15 Claims, 6 Drawing Sheets

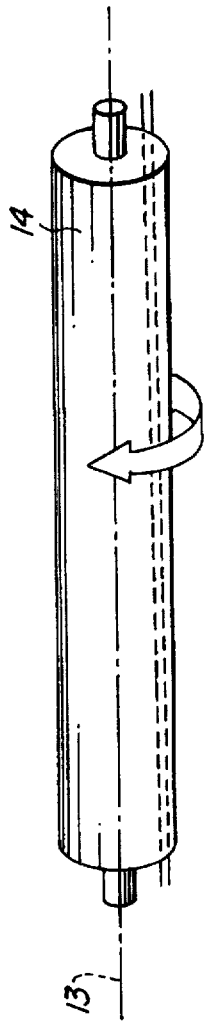
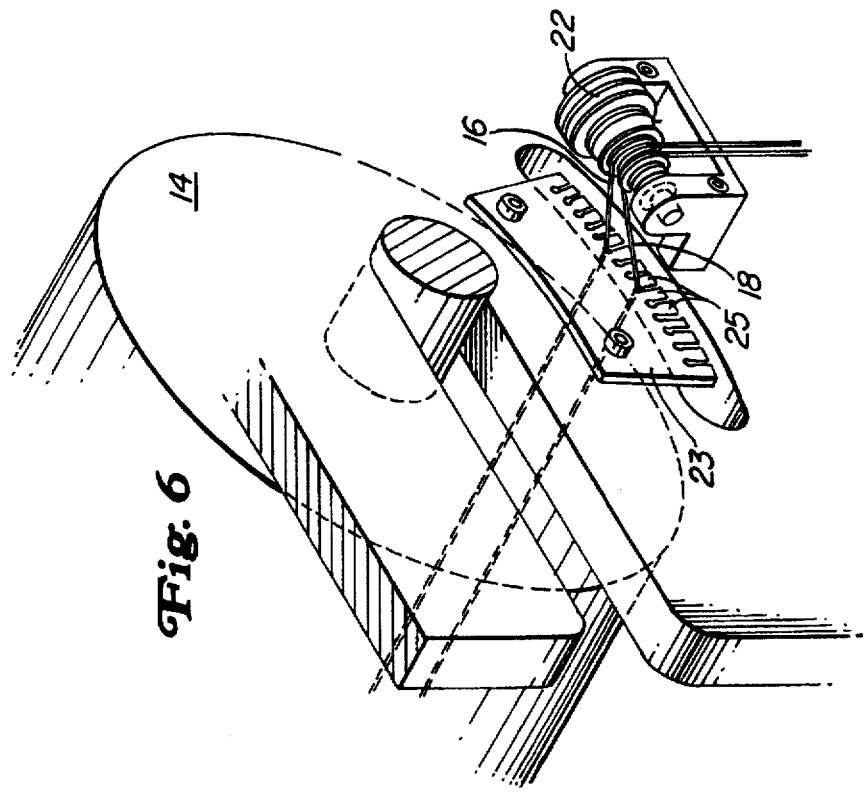
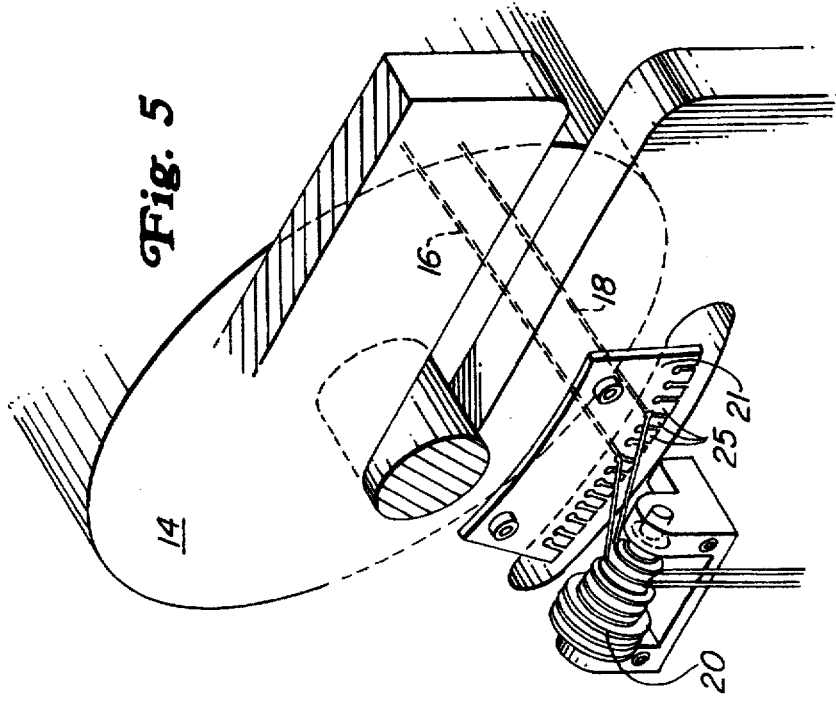

000

FOOD SHEETER

BACKGROUND OF THE INVENTION

The present invention relates to a sheeter for making flattened food products, such as tortillas, corn chips, etc. More particularly, the invention relates to a food sheeter having a wire separator for separating the sheeted food product from the sheeter roller, so that it may be readily transferred to another station, such as an oven.

Corn flour, also known as masa, unlike wheat flour, is relatively sticky and cannot conveniently be separated from a roller after being sheeted. Sheeters are used in the production of corn products such as tortillas and tortilla chips. These machines typically have front and rear rollers separated by a small gap, to form the masa supplied from a hopper into a thin sheet. A cutting roller presses against the front roller and cuts the dough or masa to desired shapes. The cut dough is then separated from the front roller and the product falls on to a conveyor belt for further processing, usually baking or frying. Scrap, i.e. the areas of the sheet remaining on the front roller after cutting and separation of the product is carried by the front roller and returned to the hopper.

As the dough will not readily release from the roller, it must be peeled or cut off. Separator wires have long been used for this purpose. Typically, a separator wire is longitudinally tensioned against the first roller. As the flattened food products hit the wire, they are separated from the roller.

However, separator wires fail on a very frequent (often daily) basis. After a relatively short period of time of separating the food product from the front roller, the wire becomes worn and breaks. Specifically, metal to metal contact between the scrap return bands and the wire creates wear points. The wear points cause rapid failure. When a wire breaks, the food product, of course, is no longer separated from the front roller and production must be halted while a new wire is installed. Wire installation and alignment can often take about an hour to complete. Accordingly, wires are generally changed between shifts to avoid breakage during production runs. While this reduces disruptions to production, it is still time consuming and burdensome. The frequent need to repair the fixed separator wires and resulting loss of production has a significant detrimental effect on food production.

Preferably, wire tension should be as high as possible, so that the food product will cleanly separate from the front roller. Reduced wire tension tends to result in wire vibration, chafing or fish scaling on the food product, and to decreased production. On the other hand, high tension increases the frequency of wire breakage. To balance these opposing considerations, wire tension is often set to about 50–60% of maximum (tensile strength), thereby compromising product quality. Simply using a larger diameter wire and increasing tension does not solve the problem, as larger diameter wires cannot generally separate the food product from the front roller as well as smaller diameter wires, especially with sticky food products.

Therefore, there is a need for an improved food sheeter with a wire separator.

SUMMARY OF THE INVENTION

The present invention is directed to a food sheeter having an improved wire separator. To this end, a food sheeter includes a separator wire tensioned across a roller. Preferably, motor driving a wire spool causes the wire to be pulled tautly across the face of the roller and simultaneously causes the wire to move from a feed spool to a take-up spool. This wire movement tends to prevent wear points and reduces or entirely eliminates wire breakage, and advantageously allows for very high tension.

Accordingly, it is an object of the present invention to provide a food sheeter with an improved wire separator. Other and further objects and advantages will appear hereinafter.

BRIEF DESCRIPTION OF THE DRAWINGS

In the drawings, wherein similar reference characters denote similar elements throughout the several views:

FIG. 5 is perspective detail view of a wire pulley assembly on the left side of the food sheeter of FIG. 1;

FIG. 6 is perspective detail view of a wire pulley assembly on the right side of the food sheeter of FIG. 1;

FIG. 7 is detail view of a roller and separator wires of the food sheeter of FIG. 1.

DETAILED DESCRIPTION OF THE PREFERRED EMBODIMENT

Figure 1:
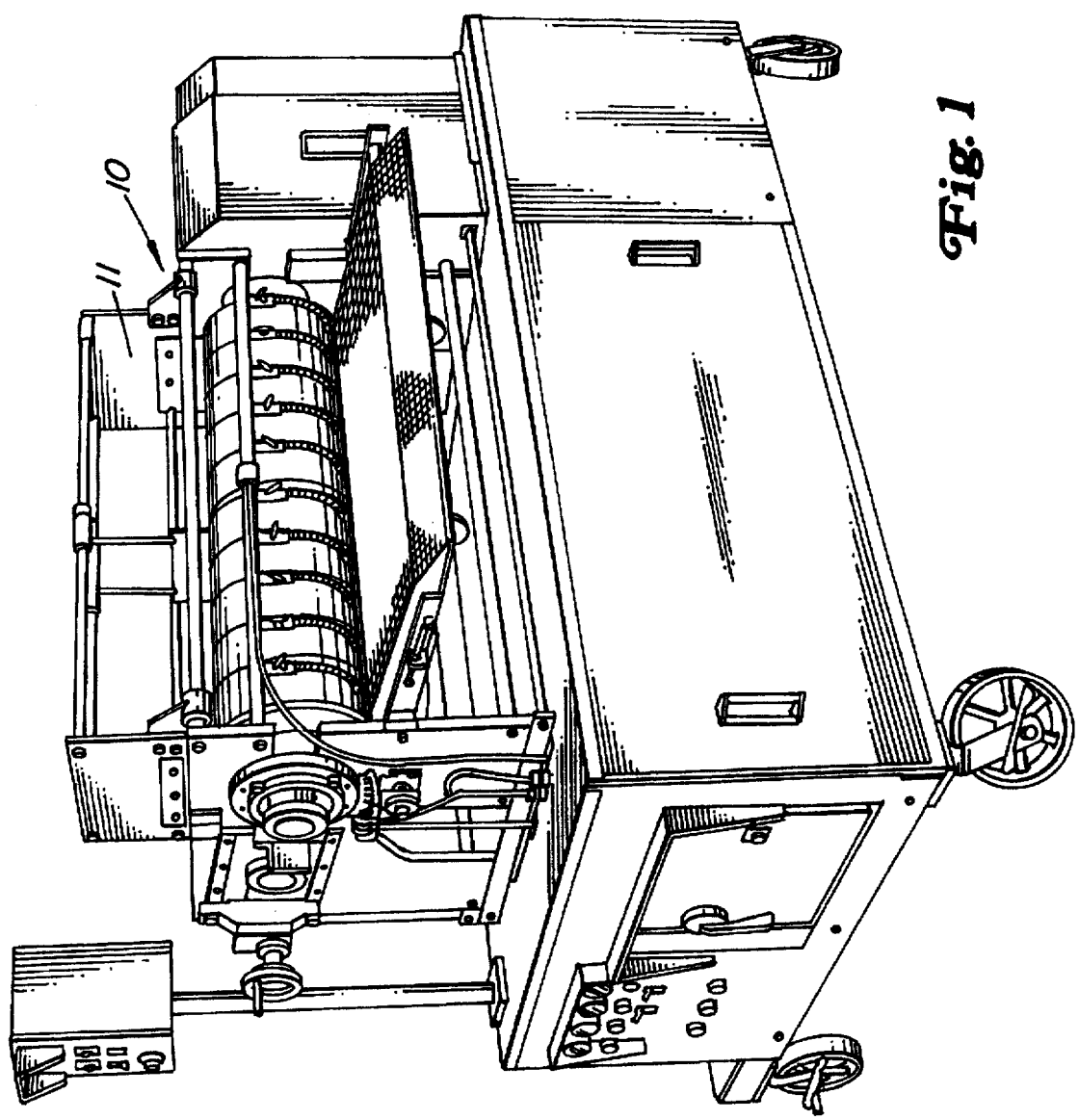
FIG. 1 is a perspective view of a food sheeter incorporating the present wire separator.
Figure 2:
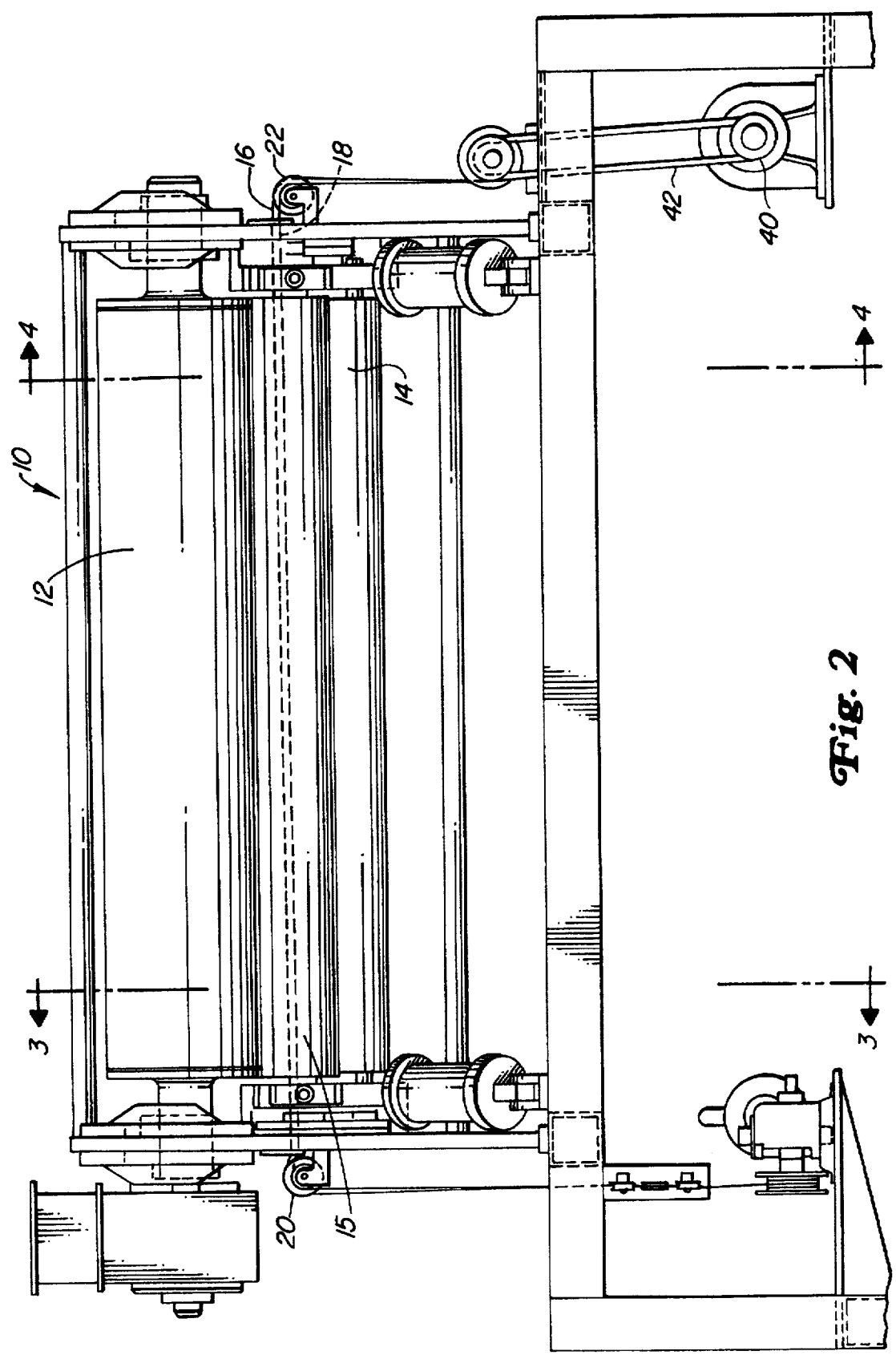
FIG. 2 is a front elevation view of the food sheeter of FIG. 1.

Turning in detail to the drawings, as shown in FIGS. 1–4, a food sheeter 10 includes a pair of rollers: a second or rear roller 12 and a first or front roller 14. The first and second rollers 12, 14 are turned by one or more motors.

The food sheeter 10 may be the well known Lawrence Equipment MEGA 10 sheeter head or similar apparatus.

Dough is loaded into a hopper 11 above the rollers. The rollers turn and the dough is sheeted between the second roller 12 and the first roller 14 and formed into a thin sheet (for example about 0.30 inches thick). As the flattened sheet emerges from the rollers, it sticks onto the first roller 14. The distance between the second roller 12 and first roller 14 may be adjustable, to create sheets of varying thickness.

Figure 3:
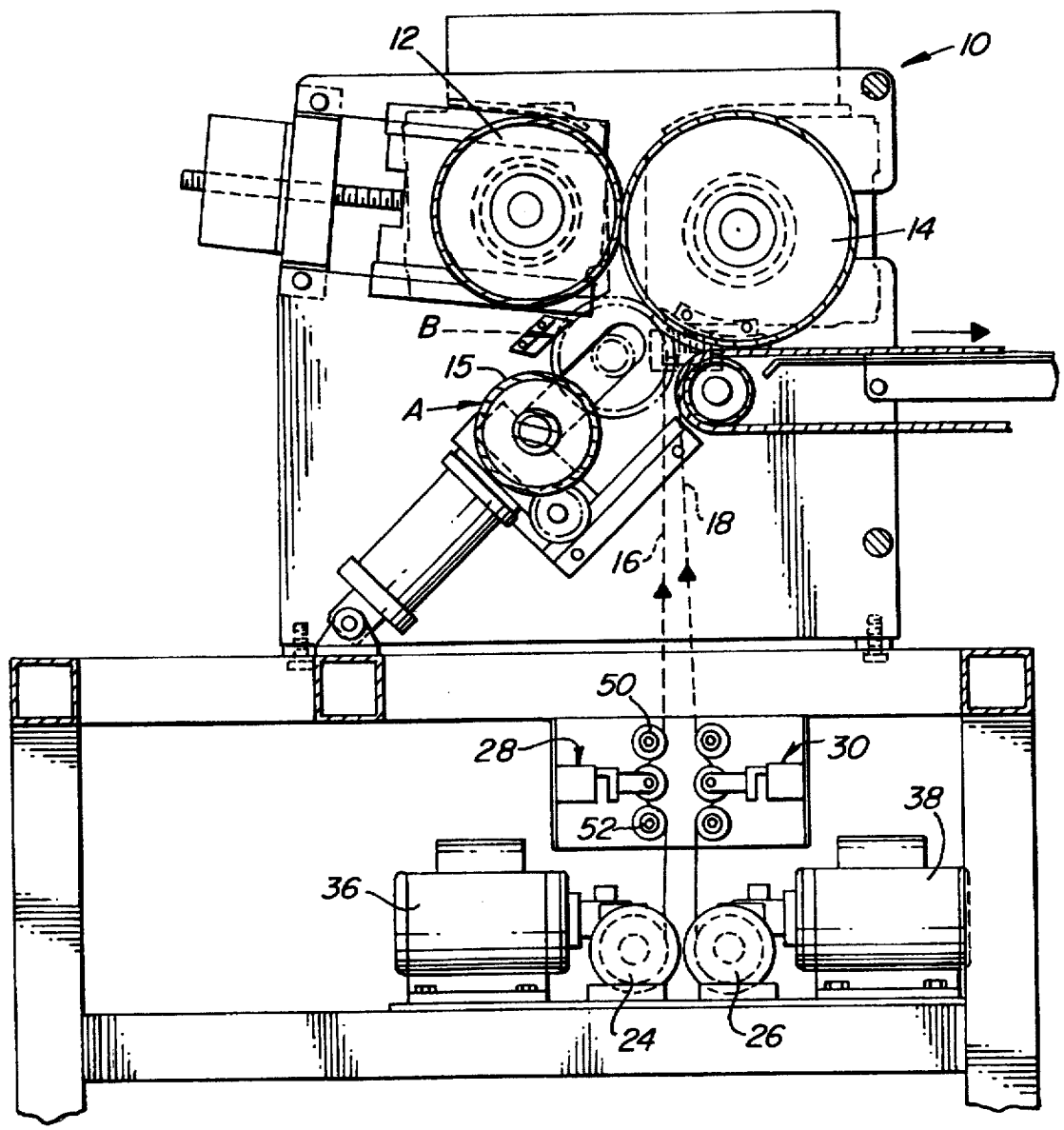
FIG. 3 is a left side elevation view in part section of the food sheeter of FIG. 1.
Figure 4:
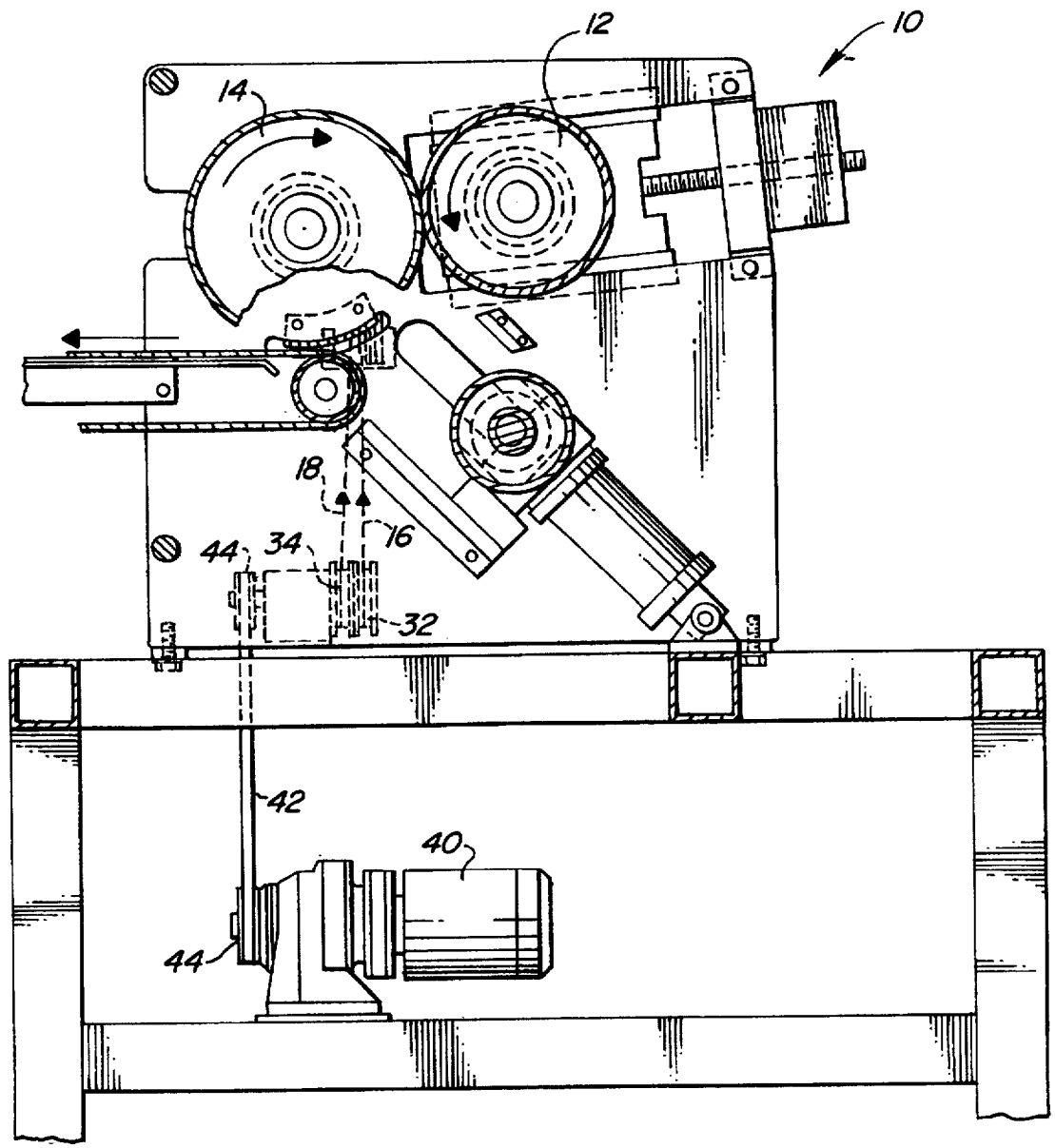
FIG. 4 is a right side elevation view in part section of the food sheeter of FIG. 1.

Referring to FIGS. 3 and 4, a cutter drum 15 is movable from a retracted position A, to an engaged position B. The cutter drum 15 includes cutting surfaces which, when in the engaged position, contact the second roller 14 and cut the flour/corn masa sheet into desired shapes. Once the dough is cut to the desired shape it must be separated from the first roller 14.

As shown in FIGS. 2 and 5–7, preferably, a pair of separator wires 18, 16 are held tightly against the surface of the first roller 14 by a pair of wire pulley assemblies 22, 20. The sheet of flour/corn is peeled or cut from the first roller 14 as the sheet is pushed against the separator wires 18, 16. A first separator wire 16 starts separating the flour/corn from the first roller 14 and the second separator wire 18 completes the separation. The first wire creates a gap between the first roller and the product (e.g., a corn chip), and the second wire knocks the product off. The first and second wires are preferably separated by ½–¾ inch. While the use of two separator wires 18, 16 has been found advantageous, the separating of the flour/corn from the roller 14 could also be accomplished with a single separator wire (especially for less sticky products), or more than two separator wires. In embodiments where the first and second wires have the same diameter, a single wire may be used by having it u-turn and cross the roller twice.

Large diameter wires tend to deform the masa more than small diameter wires. In the preferred embodiment, the first separator wire 16 has a smaller diameter than the second separator wire 18.

The separator wires are positioned at an angle with respect to the first roller's longitudinal axis 13, best shown in FIG. 7. The angle allows the wire to be held tightly against the first roller across the entire width of the roller. The angle is preferably about 10°–15°. (If the wire(s) was purely parallel to the spin axis of the first roller, the wire would tend to float over the dough towards the center.) The separator wires are angled with respect to the first roller 14 by a first wire guide 23 and a second wire guide 21 as shown in FIGS. 5 and 6. The wire guides 23, 21 preferably have a comb-like form, as shown, in which the separator wires are placed between selected teeth 25. Alternatively, the wire guides 23, 21 may be continuously adjustable along a portion of the surface of the roller. Discrete wire guides may be provided for each wire.

To lessen the chance of a particular section of separator wire becoming excessively worn, the separator wires 16, 18 are advantageously automatically and continuously moved. As shown in FIG. 4, in a preferred embodiment a pair of feed spools 32, 34 are provided. One feed spool is provided for each separator wire used. The feed spools 32, 34 contain a suitable length of separator wire.

To install the first separator wire 16 on the wire separator apparatus, the first separator wire 16 is pulled from the first feed spool 32, over a first wire pulley assembly 22 (FIG. 6), through a first wire guide 23, across the surface of the first roller 14 at an angle (FIG. 2), through a second wire guide 21, over a second wire pulley assembly 20 (FIG. 5) and fed through a first load cell assembly 28, as shown in FIG. 3. The first separator wire 16 is then attached or wound onto a first take-up spool 24 (FIG. 4). Similarly, the second separator wire 18 is pulled from a second feed spool 34, over the first and second wire pulley assemblies 22, 20, through the first and second wire guides 23, 21, wound through a second load cell assembly 30, and engaged in a second take-up spool 26.

Figure 8:
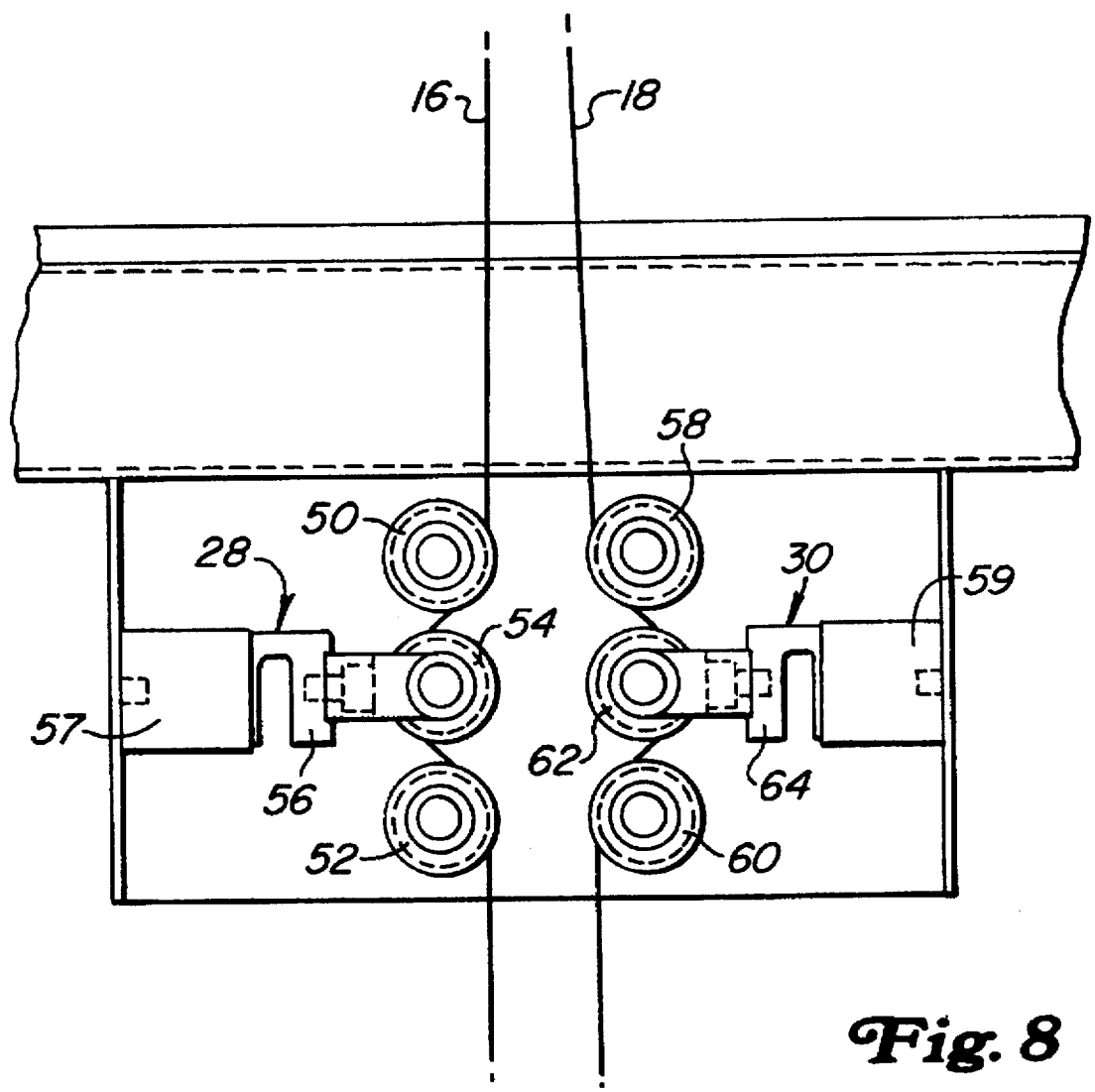
FIG. 8 is a detail view of a load cell assembly of the food sheeter of FIG. 1.

As shown in FIGS. 3 and 8, the load cell 28 comprises a pair of fixed pulleys 50, 52 spaced apart from each other. The pulleys rotate as the separator wire 16 moves across them. A tension sensing pulley 54 is supported on a bracket 56 between the fixed pulleys. The tension sensing pulley 54 is lightly biased, e.g. by a spring, and tends to urge the separator wire 16 away from the straight line path defined by the outer surfaces of the fixed pulleys. The bracket 56 is connected to a detector 57 which detects force acting on the bracket, which is a function of the tension of the wire. The detector 57 provides a corresponding input to a controller which controls the torque on the take up reel. The tension is therefore controlled to remain constant. Surges of displacement on the wires, resulting from random load variations are counteracted quickly by motor torque control. A similar arrangement of fixed pulleys 58, 60, tensioning pulley 62, bracket 64 and detector 59 provide tension to the second separator wire 18. This tension control design is well known in the art for manufacturing fibre optics or textile fibres.

In operation, after the separator wires 16, 18 have been installed, the feed spool(s) motor 40 (FIG. 4) drives the feed spools 32, 34 via a drive chain 42 and sprockets 44, allowing them to rotate at a regulated slow speed. Concurrently, the take-up motors 36, 38 (FIG. 3) cause the first and second take-up spools 24, 26 to rotate, thus taking-up or collecting the separator wire.

As they are simultaneously dispensed and collected from the respective spools, the separator wires 16, 18 are pulled over the pair of wire pulley assemblies 20, 22, and across and against the surface of the first roller 14. The continuous wire movement prevents wear points. After the take-up spools have collected all of the wire from the feed spools, they are replaced with new sets of spools.

The feed motor 40 turning the feed spools desirably moves the separator wires 16, 18 at a very slow rate, to minimize the frequency with which the separator wire needs to be installed on the wire separator apparatus after the length of wire in the feed spools 31, 32 is exhausted. While continuous wire movement is preferred, intermittent movement may also be used.

The desired amount of tension is preferably achieved by a PID torque controlled take-up spool motors. The feed spool is maintained at a constant spool speed. As the spool of wire diameter on the pay out spool decreases, the wire speed of movement also decreases slightly, because of the decreasing diameter. For example, using a spool core size diameter of 3 inches, and a fully loaded spool of wire diameter of 4 inches, the wire travel speed may start at about 1¼ inches per minute, and decrease to about ¾ inches per minute, near the end of the spool.

If the first roller is, for example, 36 inches wide, the wire is entirely replaced about twice an hour. Using spool sizes in these ranges, a spool lasts about 1 month and is then replaced with a new spool. Since the wire is automatically replaced constantly, breakage is substantially eliminated.

The wire is preferably steel music wire or spring stainless steel, with wire diameters advantageously running from about 0.012–0.020 inch. As an example, with a 0.018 inch diameter wire, tension is set just below the breaking threshold of about 90 lbs. In contrast, if the same wire were fixed, as with previous food sheeters, it could reliably be tensioned only to about 45–55 lbs., and even then would likely last only for one day or a single shift. Various equivalents to a torque controlled motor may be used to control wire tension. For example, mechanical or air pressure tensioning devices may be used, and may be digitally set and controlled, and repeated for consistent tensioning.

Thus, a novel food sheeter is disclosed. While embodiments and applications of this invention have been shown and described, it would be apparent to those skilled in the art that many more modifications and mechanical equivalents and substitutions are possible without departing from the inventive concepts herein. The invention, therefore, is not to be restricted except in the spirit of the appended claims.

We claim:

1. A wire separator system for a food sheeter, comprising:

a front roller rotatably mounted on a frame;

a feed spool on a first side of the front roller;

at least one separator wire on the feed spool;

a motor for rotating the feed spool;

at least one pulley supporting the separator wire adjacent to the front roller;

a take-up spool on a second side of the front roller opposite the first side, with the separator wire wound onto the take-up spool; and a motor for rotating the take-up spool.

2. The wire separator of claim 1 further comprising a tension sensor to sense the amount of tension in the separator wire, and a controller linked to tension sensor and at least one motor controller for controlling torque exerted by the motor, thereby controlling tension in the wire.

3. The wire separator of claim 1 wherein the roller has a longitudinal axis, and further comprising at least one wire guide for guiding the separator wire at an angle with respect to the longitudinal axis of the roller.

4. The system of claim 2 wherein the controller includes means for moving the wire continuously intermittently, or periodically.

5. The system of claim 1 wherein the separator wire is tensioned tightly against the roller.

6. The system of claim 1 further comprising a second separator wire extending across the roller.

7. The system of claim 6 wherein the second separator wire is spaced apart from, and has a larger diameter than, the first wire.

8. The system of claim 1 wherein the separator wire extends at an angle of about from 10° to 15° to the axis of the roller.

9. The system of claim 2 further comprising means for turning the feed spool at constant spool speed and for turning the take-up spool at variable speed controlled by torque loop.

10. The system of claim 1 further comprising means for moving the wire across the roller at a substantially constant speed in the range of about ¾ to 1¼ inch per minute.

11. The system of claim 1 wherein the wire is a steel wire having an approximately 0.018 inch diameter and the motors maintain a tension in the wire of about 90 lbs.

12. A food sheeter comprising:

a front roller having a longitudinal axis, a first end, and a second end; and a wire separator comprising:
 a separator wire;
 a feed spool for dispensing the separator wire;
 a feed motor connected to the feed spool;
 a first wire pulley assembly adjacent the first end of the front roller, the separator wire extending over the first wire pulley assembly toward the second end of the front roller;
 a second wire pulley assembly adjacent the second end of the roller, the separator wire extending from the first end of the front roller over the second wire pulley assembly;
 at least one wire guide guiding the separator wire at an angle relative to the longitudinal axis of the front roller;
 a take-up spool for collecting the separator wire; and
 a take-up spool motor connected to the take-up spool for rotating the take-up spool whereby the separator wire may be continuously moved across the front roller.

13. In a food sheeter of the type having a front roller and a rear roller separated by a small gap, and a cutting roller pressing against the front roller, to cut a thin sheet of dough or masa into a desired shape, the improvement comprising:

a first wire guide adjacent a first end of the front roller;

a second wire guide adjacent a second end of the front roller;

a continuous wire formed into a feed spool, extending through the first wire guide, across the front roller, through the second wire guide, and onto a take-up spool; and means for automatically moving the wire across the front roller.

14. The food sheeter of claim 13 further comprising means for continuously moving the wire across the front roller.

15. The food sheeter of claim 13 further comprising means for tensioning the wire independent of the means for moving the wire.

* * * * *